US012700094B2

(12) United States Patent
Stancanello

(10) Patent No.: US 12,700,094 B2
(45) Date of Patent: Aug. 4, 2026

(54) METHODS FOR TRAINING A TOMOSYNTHESIS RECONSTRUCTION MODEL, OR FOR GENERATING AT LEAST ONE CONTRAST TOMOGRAM DEPICTING A TARGET BODY PART DURING AN INJECTION OF CONTRAST AGENT

(71) Applicant: GUERBET, Villepinte (FR)

(72) Inventor: Joseph Stancanello, Gif sur Yvette (FR)

(73) Assignee: GUERBET, Villepinte (FR)

( * ) Notice: Subject to any disclaimer, the term of this patent is extended or adjusted under 35 U.S.C. 154(b) by 228 days.

(21) Appl. No.: 18/569,420

(22) PCT Filed: Jul. 1, 2022

(86) PCT No.: PCT/EP2022/068343
§ 371 (c)(1),
(2) Date: Dec. 12, 2023

(87) PCT Pub. No.: WO2023/275392
PCT Pub. Date: Jan. 5, 2023

(65) Prior Publication Data
US 2024/0265537 A1      Aug. 8, 2024

(30) Foreign Application Priority Data
Jul. 2, 2021      (EP) ..................................... 21305926

(51) Int. Cl.
*G06T 7/00*          (2017.01)
*G06T 7/10*          (2017.01)
*G06T 12/30*        (2026.01)

(52) U.S. Cl.
CPC .............. *G06T 7/0012* (2013.01); *G06T 7/10* (2017.01); *G06T 12/30* (2026.01);
(Continued)

(58) Field of Classification Search
CPC ....... A61B 6/032; A61B 6/481; A61B 5/7267; A61B 5/7275; A61B 6/5217;
(Continued)

(56) References Cited

U.S. PATENT DOCUMENTS 10,970,887 B2 *   4/2021   Wang ..................... A61B 5/055
10,997,716 B2 *   5/2021   Zaharchuk ........... G06N 3/0464
(Continued)

FOREIGN PATENT DOCUMENTS

EP            4 113 537 A1       1/2023
WO      WO 2017/223560 A1    12/2017

OTHER PUBLICATIONS

Chandrashekar, Anirudh, et al. "A deep learning approach to generate contrast-enhanced computerised tomography angiography without the use of intravenous contrast agents." arXiv preprint arXiv:2003.01223 (2020) (Year: 2020).*
(Continued)

*Primary Examiner* — Courtney Joan Nelson
(74) *Attorney, Agent, or Firm* — Birch, Stewart, Kolasch & Birch, LLP

(57)          ABSTRACT
The present invention relates to a method for generating at least one contrast tomogram depicting a target body part during an injection of contrast agent, the method being characterized in that it comprises the implementation, by a data processor (11*b*) of a second server (1*b*), of steps of: (a) Obtaining a pre-contrast tomogram of said target body part prior to the injection of contrast agent, and raw projection data acquired over a limited rotation angle span during the injection of contrast agent; (b) Segmenting said target body part on the pre-contrast tomogram; (c) Generating the contrast tomogram, by application of a tomosynthesis reconstruction model to said segmented pre-contrast tomogram and the obtained raw projection data.

13 Claims, 2 Drawing Sheets

(52) U.S. Cl.
CPC .............. *G06T 2207/10072* (2013.01); *G06T 2207/10116* (2013.01); *G06T 2211/436* (2013.01)

(58) Field of Classification Search
CPC ......... G06T 2207/20084; G06T 7/0012; G06T 2207/20081; G06T 5/50; G06T 11/008; G06T 2207/30004; G06T 19/20; G06T 11/00; G06T 2207/10096; G06T 2210/41; G06T 2207/10072; G06T 15/00; G06T 2211/441; G06T 7/174; G06T 11/003; G06T 7/10; G06T 2207/10116; G06T 2211/436; G16H 30/20; G16H 30/40; G16H 50/20; G16H 30/00; G06N 3/08; G06N 20/00; G06V 10/10; G06V 2201/03; G06V 10/40
See application file for complete search history.

(56) References Cited

U.S. PATENT DOCUMENTS

| | | | | |
|---|---|---|---|---|
| 2020/0294288 A1* | 9/2020 | Smith | .................... | G16H 30/40 |
| 2020/0367844 A1* | 11/2020 | Dang | ........................ | G06T 5/60 |
| 2021/0375010 A1* | 12/2021 | Soons | ................... | G06T 11/006 |

OTHER PUBLICATIONS

Chandrashekar et al., "A Deep learning Approach to Generate Contrast-Enhanced Computerised Tomography Angiography without the Use of Intravenous Contrast Agents," arXiv:2003.01223v1, Mar. 2, 2020, 7 pages total.
Extended European Search Report for European Application No. 21 30 5926, dated Dec. 17, 2021.
International Search Report for International Application No. PCT/EP2022/068343, dated Nov. 28, 2022.

* cited by examiner

METHODS FOR TRAINING A TOMOSYNTHESIS RECONSTRUCTION MODEL, OR FOR GENERATING AT LEAST ONE CONTRAST TOMOGRAM DEPICTING A TARGET BODY PART DURING AN INJECTION OF CONTRAST AGENT

FIELD OF THE INVENTION

The field of this invention is that of medical imaging.

More particularly, the invention relates to a method for generating at least one contrast tomogram depicting a target body part during injection of contrast agent.

BACKGROUND OF THE INVENTION

Contrast agent are substance used to increase the contrast of structures or fluids within the body in medical imaging.

They usually absorb or alter external radiations emitted by the medical imaging device. In x-rays, contrast agents (such as iodinated contrast agent intravenously injected to the patient) enhance the radiodensity in a target tissue or structure.

For instance, Dynamic Contrast-Enhanced Computed Tomography (DCE-CT) has been proposed to characterize focal lesion in prostate cancer radiotherapy (RT). In particular, an iodinated contrast agent is injected intravenously to the patient and rapid repeated imaging is performed in order to obtain a temporal sequence of perfusion tomograms.

Historically, RT uses plain CT as primary planning modality, but other modalities such as Magnetic Resonance Imaging (MRI) or Positron Emission Tomography (PET) are generally required to be co-registered to planning CT to identify more aggressive regions focal for enabling treatments, where only aggressive foci identified by means of imaging are irradiated.

By contrast, the DCE-CT approach enables radiation oncologists to directly target the lesion on CT without the need for a DCE-MRI to be fused to planning CT, which is highly advantageous because of the lack of additional costs (e.g. MRI or PET) and co-registration associated errors.

The problem is that DCE-CT stays an x-ray-based imaging, involving high radiation exposure (higher than a plain CT because there is a plurality of tomograms to be acquired), in contrast to Magnetic Resonance Imaging (MRI). Though patients undergoing radiation therapy are usually treated with radiation doses much higher than that from DCE-CT, recently there has been a raising care paid to minimize radiation dose. This is in alignment with ALARA principle, i.e. radiation dose As Low As Reasonably Achievable.

There is consequently still a need for a new method for contrast-enhanced tomography with the highest image quality while minimizing radiation dose.

SUMMARY OF THE INVENTION

For these purposes, the present invention provides according to a first aspect a method for generating at least one contrast tomogram depicting a target body part during an injection of contrast agent, the method being characterized in that it comprises the implementation, by a data processor of a second server, of steps of:

(a) Obtaining a pre-contrast tomogram of said target body part prior to the injection of contrast agent, and raw projection data acquired over a limited rotation angle span during the injection of contrast agent;

(b) Segmenting said target body part on the pre-contrast tomogram;

(c) Generating the contrast tomogram, by application of a tomosynthesis reconstruction model to said segmented pre-contrast tomogram and the obtained raw projection data.

Said contrast tomogram and said raw projection data are respectively a i-th contrast tomogram and i-th raw projection data, with $i>0$, the method comprising a step (d) of obtaining $i+1$-th raw projection data acquired over said limited angle span during the injection of contrast agent; and a step (e) of generating a $i+1$-th contrast tomogram, by application of the tomosynthesis reconstruction model to the segmented pre-contrast tomogram and/or at least one j-th contrast tomogram, $0<j\leq i$ and said $i+1$-th raw projection data.

Step (e) comprises combining the segmented pre-contrast tomogram with at least one j-th contrast tomogram, $0<j\leq i$, into a combined segmented tomogram, the tomosynthesis reconstruction model being applied to the combined segmented tomogram.

Preferred but non limiting features of the present invention are as it follows:

Said pre-contrast tomogram is generated from raw projection data acquired over a rotation angle span of at least 180° prior to the injection of contrast agent, said limited rotation angle span being inferior to 60°.

Said raw projection data is acquired by an x-ray medical imaging device connected to the second server.

Said target body part is a potentially cancerous organ such as a prostate gland.

The method comprises recursively iterating steps (d) and (e) so as to obtain the sequence of successive contrast tomograms.

The method comprises verifying whether a termination condition is true, steps (d) and (e) being iterated if said termination condition is false.

Said termination condition is that, for each area of signal changes with respect to said given threshold between at least one k-th contrast tomogram, $0<k\leq i+1$, and the pre-contrast tomogram, the signal change in said area between the $i+1$-th contrast tomogram and the i-th tomogram is below said threshold.

The limited rotation angle span for the $i+1$-th raw projection data starts where the limited rotation angle span for the i-th raw projection data ends.

Said tomosynthesis reconstruction model comprises an artificial intelligence model such as Convolutional Neural Network, CNN, trained from a base of training pre-contrast or contrast tomograms respectively depicting a body part prior to and during an injection of contrast agent, each tomogram being at least associated to the corresponding raw projection data from which it has been generated.

Step (a) comprises determining, by application of a prediction model to said pre-contrast tomogram, candidate value(s) of at least one injection parameter of said injection of contrast agent, such that the sequence of said pre-contrast tomogram and the at least one contrast tomogram depicting said body part during injection of contrast agent in accordance with the determined candidate value(s) of said injection parameter(s) minimizes a radiation dose.

Said injection parameter(s) comprises an injection duration prior to the acquisition of the raw projection data.

Step (a) further comprises providing said determined candidate value(s) of said injection parameter(s) to the x-ray medical device (10), and obtaining in response raw projection data acquired by said x-ray medical imaging device (10) over the limited rotation angle span during the injection of contrast agent in accordance with the determined candidate value(s) of said injection parameter(s).

According to a second aspect, the invention provides a method for training a tomosynthesis reconstruction model, the method being characterized in that it comprises the implementation, by a data processor of a first server, for each of a plurality of training pre-contrast tomograms from a base of training pre-contrast or contrast tomograms respectively depicting a target body part prior to and during an injection of contrast agent, each tomogram being at least associated to the corresponding raw projection data from which it has been generated, the training pre-contrast or contrast tomograms are organized in the base into sequences corresponding to the same injection, of step(s) of (B) Segmenting said target body part on the training pre-contrast tomogram;

(C) Generating a candidate contrast tomogram, by application of the tomosynthesis reconstruction model to said segmented pre-contrast tomogram and at least a part of the raw projection data associated to a training contrast tomogram of the same sequence, said part corresponding to the raw projection data acquired over a limited rotation angle span during the injection of contrast agent, and minimizing a distance with the training contrast tomogram.

According to a third and a fourth aspect the invention provides a computer program product comprising code instructions which, when the program is executed by a computer, cause the computer to carry out a method according to the first aspect for training a tomosynthesis reconstruction model, or according to the second aspect for generating at least one contrast tomogram depicting a target body part during an injection of contrast agent; a computer-readable medium, on which is stored code instructions which, when executed by a computer, cause the computer to execute a method according to the first aspect for training a tomosynthesis reconstruction model, or according to the second aspect for generating at least one contrast tomogram depicting a target body part during an injection of contrast agent.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
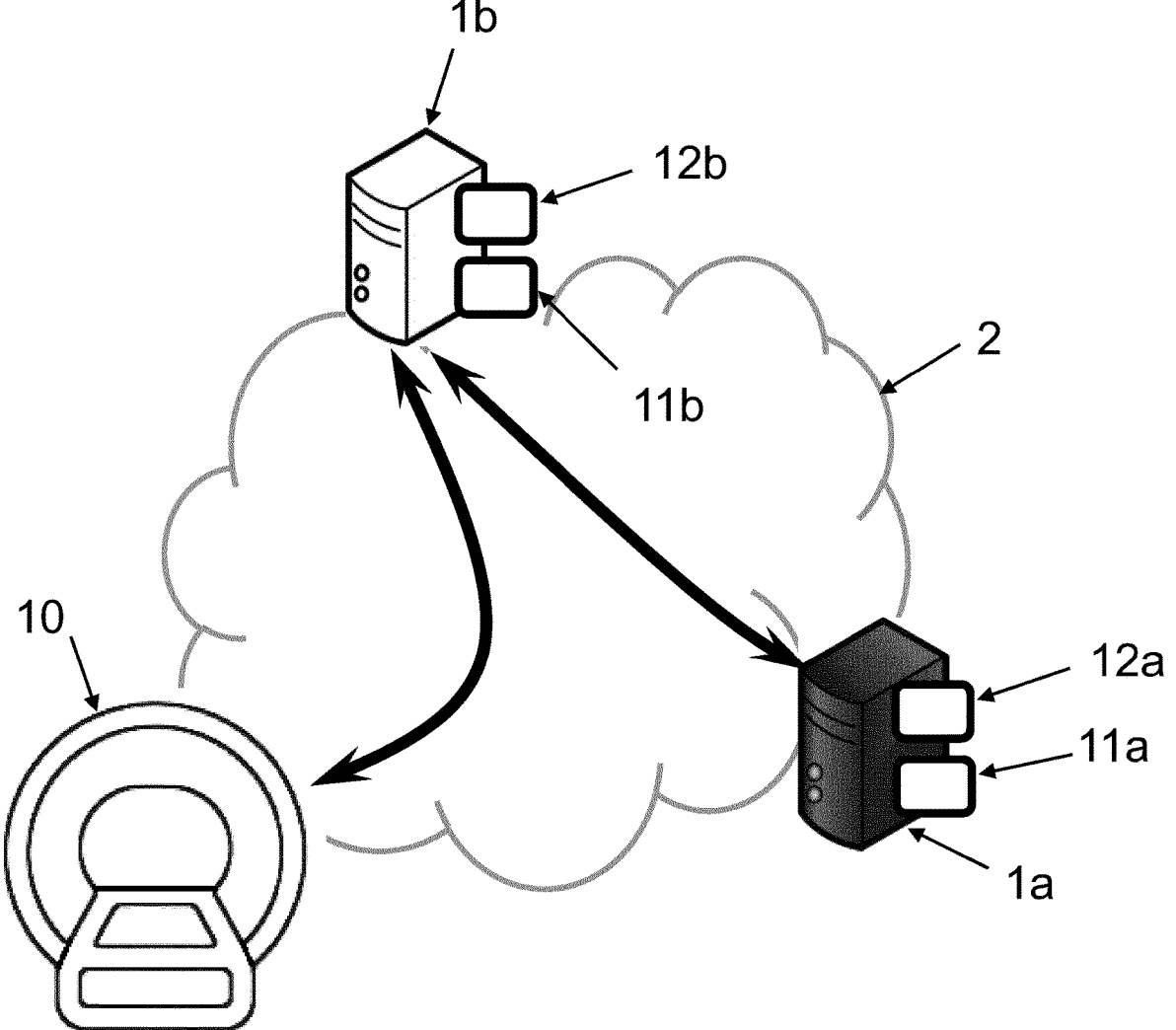
FIG. 1 illustrates an example of architecture in which the methods according to the invention is performed.

Two complementary aspects of the present invention are proposed:

a method for training at least a tomosynthesis reconstruction model for generating a contrast tomogram (and in an embodiment a further prediction model);

a method for generating at least one contrast tomogram using the tomosynthesis reconstruction model (and possibly said prediction model), advantageously trained according to the previous method.

By tomogram, it is meant a "computed" tomogram, or CT, i.e. a 2D or 3D artificial image reconstructed from raw projection data. In a known fashion, these projections are effectively the Radon transformation of the structure of the object to be scanned (a body part, see after). Reconstruction essentially involves solving the inverse Radon transformation.

By pre-contrast tomogram, or "plain" tomogram, it is meant a tomogram depicting a target body part (to be monitored) prior to an injection of contrast agent, for a person or an animal. By contrast tomogram it is meant a tomogram depicting said body part during or after the injection of contrast agent.

In other words, if there is a temporal sequence of tomograms, the first one is the pre-contrast tomogram, and each of the following is a contrast tomogram. In the case of 3D tomograms (for instance DCE-CT), the tomograms encompass the volume of the target body part, and the sequence is hence a 4D object.

Said target body part is preferably a potentially cancerous organ such as a prostate gland, i.e. the (pre-contrast or contrast) tomograms depict inner structures of said organ, in particular to measure tissue density and morphologic features. The contrast tomograms further highlight increased blood flow related to angiogenesis.

The (pre-contrast or contrast) tomograms as explained derived from raw projection data directly acquired, by a medical imaging device using ionizing radiations, in particular an X-ray medical imaging device such as an X-ray rotational scanner. Therefore, said raw projection data are acquired over a given rotation angle span, as it will be explained below. It is to be noted that a visual representation of the raw projection data obtained is called a sinogram, yet it is not sufficient for interpretation.

The acquisition of a said raw projection data involves, for the contrast tomograms, the injection of a contrast agent such as iodinated contrast agent.

The present invention astutely makes use of artificial intelligence (AI) to perform a very efficient "Dynamic Contrast Enhanced Digital Tomosynthesis".

Digital tomosynthesis (DTS) is indeed a method for performing high-resolution limited-angle tomography at radiation dose levels comparable with conventional (projectional) radiography. In ordinary CT, the source/detector makes at least a complete 180° rotation (generally 180° plus half divergency cone angle) about the subject for obtaining a complete set of data from which tomograms may be reconstructed, i.e. said raw projection data is acquired over a large rotation angle span of at least 180°. DTS, on the other hand, only uses a limited rotation angle spans (e.g. less than 60°, preferably between 15 and 60°, more preferably between 20 and 30°) with a lower number of discrete exposures than CT, hence the lower radiation dose.

The difficulty is that due to partial data sampling with very few projections, approximation algorithms have to be used, potentially leasing to a decrease in quality. Filtered back projection and iterative, expectation-maximization algorithms have both been used to attempt to reconstruct the data.

The present invention proposes the use of an AI tomosynthesis reconstruction model for allowing to generate all the contrast tomograms in real time while maintaining high quality, for a low radiation dose.

In more details:

1—each contrast tomogram is generated using DTS so as to globally decrease the radiation dose with respect to CT;

2—said limited rotation angle span is successively shifted when acquiring raw projection data for the sequence of contrast tomograms, which leads to gradually cover a large angle rotation span (for instance a sequence of 6 contrast tomograms each for a span of 30° actually covers the same total rotation angle span of 180° as a conventional CT);

3—the use of an AI tomosynthesis reconstruction model allows to take as further input a pre-contrast plain CT for "focusing" the reconstruction.

The tomosynthesis reconstruction model (and the optional prediction model) is an artificial intelligence (AI) algorithm, in particular a neural network (NN—and in particular a convolutional neural network, CNN but possibly a Support Vector Machine (SVM), Random Forests (RF), etc., trained using machine learning (ML) algorithms. In the following description we will take the preferred example of a CNN (referred to as prediction CNN), but the invention is not limited to this embodiment, in particular AI algorithms of different natures could be used.

The above-mentioned methods are implemented within an architecture such as illustrated in FIG. 1, by means of a first and/or second server 1a, 1b. The first server 1a is the training server (implementing the training method) and the second server 1b is a processing server (implementing the processing method). It is fully possible that these two servers may be merged.

Each of these servers 1a, 1b is typically remote computer equipment connected to an extended network 2, such as the Internet for data exchange. Each one comprises data processing means 11a, 11b of processor type (in particular the data processor 11a of the first server 1a have strong computing power, since learning is long and complex compared with ordinary use of the trained models), and optionally storage means 12a, 12b such as a computer memory e.g. a hard disk. The second server 1b may be connected to one or more medical imaging devices 10 as client equipment, for providing raw projection data (or even directly plain tomograms if the medical imaging device 10 has the computing capability to reconstruct them) to be processed, and optionally receiving back acquisition parameters.

Note that it is supposed that the imaging device 10 comprises an injector for performing the injection of contrast agent, said injector applying the injection parameters.

The memory 12a of the first server 1a stores a training database i.e. a set of tomograms referred to as training tomograms. Each tomogram of the database could be pre-contrast or contrast, and associated to the corresponding raw projection data from which it has been generated. Note that the tomograms corresponding the same injection (i.e. forming a sequence) are associated into sequences. In an embodiment, each tomogram/set of tomograms can also be associated to the corresponding parameters (at least one injection parameter, and preferably at least one context parameter chosen among a physiological parameter and/or acquisition parameter), and possibly to a quality level.

Obtaining the Pre-Contrast Tomogram

Figure 2:
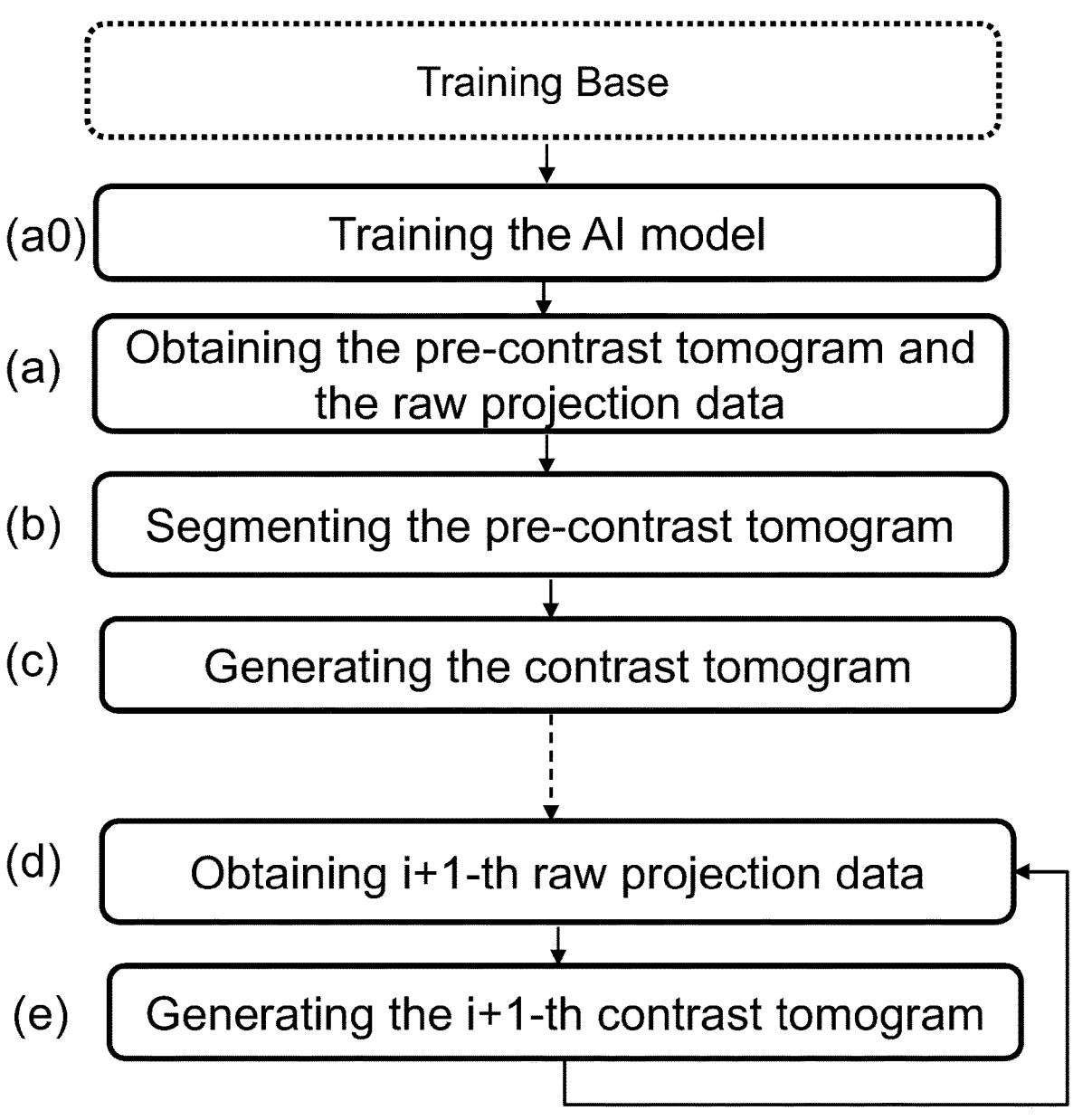
FIG. 2 illustrates an embodiment of the methods according to the invention.

As represented by FIG. 2, the method for generating at least one contrast tomogram depicting a target body part during an injection of contrast agent starts with a step (a) of obtaining a pre-contrast tomogram of said target body part prior to the injection of contrast agent, and raw projection data acquired over a limited rotation angle span during the injection of contrast agent, preferably from a medical imaging device 10 connected to the second server 1a.

Note that the pre-contrast tomogram is preferably an ordinary (plain) CT generated from raw projection data acquired over a large rotation angle span, i.e. of at least 180° prior to the injection of contrast agent, said limited rotation angle span being as explained inferior to 60°.

The pre-contrast tomogram may be either directly generated by the medical imaging device 10, or said raw projection data acquired over a large rotation angle span is also obtained at step (a) and the data processor 11b of the second server 1b generates this pre-contrast tomogram from said raw projection data acquired over a large rotation angle span.

Preferably, step (a) may also comprise obtaining value(s) of at least one context parameter of said pre-contrast tomogram, typically physiological parameter(s) and/or acquisition parameter(s). As explained, physiological parameters are parameters related to the individual patient whose body part is depicted by the tomogram (e.g. cardiac output, patient specific hemodynamics parameters, etc.), and acquisition parameters are related to the medical imaging device 10 (i.e. settings of the medical imaging device 10, such as kVp, mA, exposure time, etc.).

In a preferred embodiment that will be described later, for decreasing even more the radiation dose the present invention preferably proposes to consider acquisition parameters as also not variable (like the physiological parameters) and focus only on injection protocol parameters (amount of contrast agent, contrast injection speed, time delay to acquisition, etc.) which are to be optimized. Preferably, the injection protocol parameter to be optimized is the time delay to acquisition, i.e. the delay for the next tomogram acquisition. For instance, by assuming that the injection immediately starts after the pre-contrast tomogram is obtained, there is generally approximately two minutes before acquiring raw projection data acquired over a limited rotation angle span for generating the first contrast tomogram. Any data acquired before the right moment could be a useless radiation dose.

Thus, in the present invention, the radiation dose administered to the patient (during the acquisition of the sequence) can be further decreased by acquiring the minimal number of contrast tomograms at given time points. Thus, by "radiation dose" it is meant the total dose absorbed by the body part (for instance expressed in mSv) over the whole examination, i.e. for the entire sequence of said pre-contrast tomogram and said at least a contrast tomogram, the system does not have for instance to compute a dose specifically associated to each image.

In the following description, we will suppose that the contrast agent is injected at a time $t_0$, and at a time $t_1 > t_0$ (when the contrast agent is expected to have sufficiently perfused the target body part) the raw projections are acquired along an arc from a starting angular position $x_0$ to a finishing angular position $x_1$ corresponding to said limited rotation angle span (i.e. $x_1 - x_0 =$ the limited rotation angle span, for instance 30°) for the first contrast tomogram (referred to as $DTS_1$).

In a further step (b), said target body part is segmented on the pre-contrast tomogram. By "segmenting", it is meant identifying the area of the pre-contrast tomogram corresponding to the target body part and locating its boundaries. For instance, if the target body part is the prostate gland, the volume of the prostate gland is isolated in the pre-contrast tomogram. The result of the segmentation is preferably a mask that when superposed with the pre-contrast tomogram leaves only the target body part.

Lots of segmentation algorithms are known to the skilled person, including for instance AI algorithms, in particular using CNNs.

It is to be understood that step (b) can be performed simultaneously with step (a). Indeed, due to the delay before acquiring the raw projection data (at the time $t_1 > t_0$), the segmentation can be performed during this delay. In other words, the pre-contrast tomogram is obtained, then the segmentation is directly initiated, and the raw projection data is acquired only at the suitable time $t_1$ that can actually be after finishing the segmentation.

Tomosynthesis Reconstruction Model

In a main step (c), implemented by the data processor 11b of the second server 1b, the tomosynthesis reconstruction model is applied to both the segmented pre-contrast tomogram and the obtained raw projection data (acquired over a limited rotation angle span during the injection of contrast agent).

In more details, the tomosynthesis reconstruction model takes as guide the segmented pre-contrast tomogram (and more precisely its segmentation mask) for reconstructing the contrast tomogram $DTS_1$ from the raw projection data acquired over the angle span $[x_1; x_0]$.

Indeed, the only important information to get from the reconstruction is that of the target body part.

Therefore, the tomosynthesis reconstruction model preferably identifies those areas within the segmented target body part of the pre-contrast tomogram showing a signal change higher than a given threshold and focuses the reconstruction only on those areas to speed up the reconstruction process.

The tomosynthesis reconstruction model very preferably outputs the contrast tomogram $DTS_1$ where within the segmentation only those areas with a signal change higher than a given threshold is changed and highlighted.

The notion of "areas with a signal change higher than a given threshold" will be explained in more details below.

In a first embodiment, the tomosynthesis reconstruction model is directly trained from sets of pairs of raw projection data and corresponding already reconstructed contrast tomograms, used as expected output (ground truth). In other words, such tomosynthesis reconstruction model might generate the contrast tomogram only from the raw projection data acquired over a limited rotation angle span during the injection of contrast agent, and the segmented pre-contrast tomogram is only used for speeding the application of the model and enabling a real time use.

To this end, a separate AI algorithm could be further trained to identify in the sinogram (the visual representation of the raw projection data) those areas which present a signal increase with respect to the pre-contrast tomogram within the segmented target body part.

In a second embodiment, the tomosynthesis reconstruction model is trained from sequences of at least a segmented pre-contrast tomogram and a contrast tomogram (still used as expected output) associated to the corresponding raw projection data from which is has been generated, i.e. the model directly learns the capability to focus on the segmented target body part (of the pre-contrast tomogram).

Note that in both cases the already reconstructed contrast tomograms could be derived from DCE-CT, i.e. they have been generated from raw projection data acquired over a large rotation angle span (>180°) with conventional techniques (without DTS).

We could thus simply consider a sub-part of the raw projection data acquired over said large rotation angle span as raw projection data acquired over limited rotation angle span (for instance 30° over 180°). The number of training examples can be easily augmented by considering several shifted sub-parts of said large rotation angle span as several limited rotation angle spans, each associated to the same contrast tomogram as expected output. For example [0°; 30°], [10°; 40°], [20°; 50°], [30°; 60°] . . . [150°; 180°] are 18 limited angle spans of 30° extracted from the large span [0°; 180°]. For each of these limited rotation angle spans, the model is trained to reconstruct from the corresponding raw projection data the same contrast tomogram.

Sequence of Contrast Tomograms

In a preferred embodiment, the present method could be performed recursively for generating a plurality of successive contrast tomograms depicting the target body part during an injection of contrast agent. In other words, could be obtained from a temporal sequence of the pre-contrast tomograms and said contrast tomograms In the context of a sequence of contrast tomograms, we will refer to each contrast tomogram and raw projection data respectively as a i-th contrast tomogram ($DTS_i$) and i-th raw projection data, with $i > 0$ their index. In order, the pre-contrast tomogram is generated, then the first contrast tomogram, the second contrast tomogram, etc.

The present method preferably comprises a step (d) of obtaining i+1-th raw projection data acquired over said limited angle span during the injection of contrast agent (still from the medical imaging device 10).

As explained, said limited rotation angle span is advantageously successively shifted when acquiring raw projection data for the sequence of contrast tomograms, so as to gradually cover a large angle rotation span. In other words, the limited rotation angle span for the i+1-th raw projection data starts where the limited rotation angle span for the i-th raw projection data ends.

For example:

the first raw projection data (for generating the first contrast tomogram) is acquired along an arc from a starting angular position $x_0$ to a finishing angular position $x_1$ corresponding to said limited rotation angle span;

the second raw projection data (for generating the second contrast tomogram) is acquired along an arc from the starting angular position $x_1$ to a finishing angular position $x_2$ corresponding to said limited rotation angle span;

. . .

The i-th raw projections data (for generating the i-th contrast tomogram) is acquired along an arc from the starting angular position $x_{i-1}$ to a finishing angular position $x_i$ corresponding to said limited rotation angle span;

the i+1-th raw projection (for generating the i+1-th contrast tomogram) is acquired along an arc from the starting angular position $x_i$ to a finishing angular position $x_{i+1}$ corresponding to said limited rotation angle span.

We have $x_1 - x_0 = x_2 - x_1 = x_i - x_{i-1} = x_{i+1} - x_i =$ the limited rotation angle span, for instance 30°.

The method then comprises a step (e) of generating a i+1-th contrast tomogram $DTS_{i+1}$, by application of the tomosynthesis reconstruction model to the segmented pre-contrast tomogram and/or at least one j-th contrast tomogram $DTS_j$, $0 < j \le i$, and said i+1-th raw projection data.

Each j-th contrast tomogram, $0 < j \le i$, is already available, only the i+1-th contrast tomogram is yet to be generated. In other words, in step (e), knowing the pre-contrast tomogram and each j-th contrast tomogram $DTS_j$ up to the i-th one, the i+1-th contrast tomogram can be generated from the i+1-th raw projection data, at least one of the said previous tomograms being used as a guide.

Note that the step (e) can be seen as a generic version of step (c), with step (c) as the "0-th" iteration of the step (e), and then the step (e) repeated as many times as further contrast tomograms after the first one are needed (see below the termination condition).

Indeed, the method advantageously comprises recursively iterating steps (d) to (e) so as to obtain a sequence of successive contrast tomograms.

Note that it is preferred to have at least one segmented tomogram as guide, i.e. the tomosynthesis reconstruction model may be only applied to the i+1-th raw projection data and the pre-contrast tomogram, but preferably, step (e) comprises either segmenting said target body part on at least one contrast tomogram (like for step (b)), or combining the segmented pre-contrast tomogram with at least one j-th contrast tomogram, $0<j\leq i$, into a combined segmented tomogram (even preferably combining the segmented pre-contrast tomogram with each j-th contrast tomogram, $0<j\leq i$, i.e. all the i+1 previously generated tomograms), the tomosynthesis reconstruction model being applied to the combined segmented tomogram.

There might be several implementations for combining pre-contrast/contrast tomograms:

the tomograms may be aggregated into a hyper-stack;

The tomograms may be summed, averaged, etc.

the combined segmented tomogram could be based on subtraction of the tomograms to highlight the differences;

a combination thereof, for instance a hyper-stack comprising the segmented pre-contrast tomograms and the subtraction of several previous tomograms;

etc.

Termination

The method preferably comprises verifying whether a termination condition is true, and steps (d) to (e) are iterated (at least one more time) if said termination condition is still false, etc.

It may be performed at the end of step (e), or at the beginning of step (d): if the termination condition is true, the method is interrupted and the next raw projection data are not acquired.

In other words, steps (d) to (e) are iterated until said termination condition becomes true. Indeed, the sequence of contrast tomographs should provide enough information for holding a diagnostical value, while being as short as possible to minimize the overall radiation dosage.

This idea is to generate successive contrast tomographs till all the dynamic evolution of contrast agent within the target body part is captured.

Several different termination conditions are possible, including in particular a fixed time or a total rotation angle span (the sum of all rotation angle spans corresponding to each raw projection data, equal to $x_{i+1}-x_0=i+1$ times said limited rotation angle span, the generated contrast tomograph at the current occurrence of step (e) being the i+1-th) reaching a threshold, for instance 180°.

Alternatively, the data processor 11b looks at each region of contrast enhancement within the target body part in each contrast tomograph and calculates/predicts if there is an average enhancement increase at each step within the regions of enhancement. The termination condition is thus that all the identified regions of enhancement over time do not increase anymore (or they are below a given threshold) or the prediction does not reveal any further increase.

Let us define $A_{k,x}$, $x=1, \ldots, X_k$, the $X_k$ areas of signal changes with respect to a given threshold (referred to as $\varepsilon$) between the k-th contrast tomogram $DTS_k$ and the pre-contrast tomogram that are not included in a previous $A_{k',x}$, $0<k'<k$. In other words, the $A_{k,x}$ are the "new" areas of signal change, i.e the areas whose contrast uptake is later with respect to $A_{k',x}$.

Hence, in $DTS_1$ we can identify the $A_{1,x}$, in $DTS_2$ we can identify both the $A_{1,x}$ and the $A_{2,x}$, and in the most recent tomogram $DTS_i+1$ we can identify all the $A_{k,x}$, $0<k\leq i+1$ (i.e. the $A_{1,y}$, the $A_{2,y}$ . . . the $A_{i+1,y}$), which are disjoined by definition. Note that the $A_{k,x}$ just define geometrical areas (i.e. volumes in the case of 3D tomograms) that exist in any contrast or pre-contrast tomographs, so that the signal values corresponding a given $A_{k,x}$ could vary from a contrast tomogram to another.

We refer as $A_{k,x}(DTS_i)$ the signal values corresponding a given area $A_{k,x}$ in the i-th contrast tomogram $DTS_i$, with $k\leq i$.

The termination condition is preferably that, for all $A_{k,x}$, (i.e. $\forall k,x$), $|A_{k,x}(DTS_i+1)-A_{k,x}(DTS_i)|\leq\varepsilon$. To rephrase, the termination condition is false if $\exists A_{k,x}$ such as $|A_{k,x}(DTS_i+1)-A_{k,x}(DTS_i)|>\varepsilon$. That means that dynamic behavior of the wash-in/wash-out curves have been captured.

Note that, as we will see below, in the case the termination condition is verified at the beginning of step (d), the values $A_{k,x}(DTS_{i+1})$ could be predicted even before the i+1 raw projection data are acquired, so as to avoid performing step d (d) and (e) if the termination condition is true.

Indeed, if is constated after step (e) that for all $A_{k,x}$ $|A_{k,x}(DTS_{i+1})-A_{k,x}(DTS_i)|\leq\varepsilon$, it means that all the dynamic evolution of contrast agent within the target body part was already captured at the previous contrast image $DTS_i$, and that the acquisition of i+1-th raw projection data (for generating $DTS_{i+1}$) was not necessary. By contrast, if is predicted before, it means the acquisition of the i+1-th raw projection data (for generating $DTS_{i+1}$) is avoided.

To summarize, the termination condition is preferably that for each area of signal changes with respect to said given threshold between at least one k-th contrast tomogram, $0<k\leq i+1$ (i.e. anyone of the already generated contrast tomograms, including the present i+1-th one), and the pre-contrast tomograph (that correspond to all $A_{k,x}$), the signal change in said area between the i+1-th contrast tomogram and the i-th tomogram is below said threshold.

Prediction Model

If the contrast agent is injected at a time $t_0$, the i-th raw projection data is started to be acquired at a time $t_i>t_{i-1}>\ldots>t_0$.

As explained, the acquisition times $t_i$ may be fixed, but are preferably optimized so as to reduce even more the radiation dose.

Generally speaking, the injection protocol parameters (amount of contrast agent, contrast injection speed, time delay to acquisition, etc.) can be optimized, using a prediction model. Preferably, the injection protocol parameter to be optimized is the time delay to acquisition, i.e. the delay for the next raw projection data acquisition (i.e. $t_{i+1}-t_i$).

As explained this prediction model could also be used for anticipating the termination condition.

Therefore, in step (a), as proposed in the application EP21315120, the prediction model can be applied to the pre-contrast tomogram (segmented or not), before the raw projection data is acquired. In other words, instead of simply obtaining the pre-contrast tomogram and the raw projection data, only the pre-contrast tomogram is obtained, then the prediction model is applied to determine how the raw projection data should optimally be acquired to minimize the radiation dose.

In more details, it aims at determining candidate value(s) of the at least one injection parameter, i.e. the output of said prediction model is the value(s) of the injection parameter(s).

The so-called candidate values are potentially optimized values to be applied when acquiring the raw projection data, such that the sequence of said pre-contrast tomogram and at least a contrast tomogram depicting said body part during injection of contrast agent in accordance with the determined candidate value(s) of said injection parameter(s) minimize the radiation dose.

In other words, the prediction model predicts the values of the injections parameters which should lead to the realization of a contrast tomogram minimizing the radiation dose.

The prediction model advantageously uses the at least one context parameter as input, such that said contrast tomogram further has the same value(s) of context parameter(s) as the pre-contrast tomogram. In other words, the prediction model uses as input the pre-contrast tomogram and the value(s) of said context parameter(s) of said pre-contrast tomograms, and outputs the candidate value(s) of the injection parameter(s).

Indeed, as explained, for simplifying the process, each context parameters (acquisition parameter(s) and/or physiological parameter(s)) is supposed fixed and only values of injection protocol parameters are determined. Therefore, the pre-contrast tomogram and the subsequent contrast tomograms are supposed to have the same values of the context parameters.

Said determined candidate value(s) of said injection parameter(s) are then provided to the medical device 10. Therefore, raw projection data for generating a contrast tomogram depicting said body part during injection of contrast agent in accordance with the determined candidate value(s) of said injection parameter(s) can be acquired by said medical imaging device 10 and provided to the second server 1b. Because of the use of the candidate value(s) of said injection parameter(s), the sequence of the pre-contrast tomogram and the contrast tomogram is expected to minimize the radiation dose inflicted to the patient.

At this point, the raw projection data acquired over a limited rotation angle span during the injection of contrast agent (in accordance with the determined candidate value(s) of said injection parameter(s)) can be obtained as originally proposed in step (a).

As already explained, the present method is preferably performed recursively for generating a plurality of contrast tomogram, and in such a case, the prediction model can itself be applied recursively in order to determine for any i-th raw projection data the suitable i-th candidate value(s) of the injection parameters.

In other words, the step (d) of obtaining the i+1-th raw projection data preferably comprises determining the i+1-th candidate value(s) of said injection parameter(s): the sequence of the pre-contrast tomogram and each subsequent contrast tomogram (i.e. including each j-th contrast tomogram, $0<j\leq i$, and the i+1-th contrast tomogram depicting said body part during injection of contrast agent in accordance with the determined i+1-th candidate value(s) of said injection parameter(s)) still minimizes the radiation dose. In other words, knowing the pre-contrast tomogram and each j-th contrast tomogram up to the i-th one, the candidate value(s) of said injection parameter(s) for the i+1-th raw projection data are optimized to continue minimizing the radiation dose.

Again, the injection protocol parameter to be optimized is preferably the time delay to acquisition, i.e. the delay between the acquisition of the i-th contrast tomogram and the acquisition of the i+1-th contrast tomogram, i.e. the optimal acquisition times $t_0$, $t_1$, . . . $t_i$, $t_{i+1}$ are therefore determined.

Note that the application of the prediction model of step (d) can be seen as a generic version of the application of the prediction model of step (a), with step (a) as the "0-th" iteration of the step (d), and then the step (d) repeated as many times as there are further contrast tomograms after the first one.

Similarly, step (d) preferably comprises providing said i+1-th candidate value(s) of said injection parameter(s) to the medical device 10. Therefore, i+1-th raw projection data for generating a i+1-th contrast tomogram depicting said body part during injection of contrast agent in accordance with the i+1-th candidate value(s) of said injection parameter(s) can be acquired by said medical imaging device 10 and provided to the second server 1b.

Then step (e) can be performed for actually generating the i+1-th contrast tomogram, etc.

In a preferred example based on the areas of signal changes $A_{k,x}$, wherein the injection protocol parameter to be optimized is the time delay to acquisition, the prediction model directly selects the next time delay as the minimum delay of signal change above the given threshold among all the signal-time curves of $A_{k,x}$, $0<k\leq i$ Within each region of signal change $A_{k,x}$ a global descriptor can be used, e.g. the mean or median of the signal in $A_{k,x}$.

Termination condition becomes true when all the $A_{k,x}$ at a given iteration shows a predicted signal change below a given threshold (i.e. no delay allows to see a signal change above the given threshold). That means that the dynamic behavior of the wash-in/wash-out curves has been fully captured, and the method is interrupted.

Training Method

In a second aspect, there is proposed a training method, implemented by the data processor 11a of the first server 1a. Said method trains the tomosynthesis reconstruction model, for generating the contrast tomogram.

By training, it is meant the determination of the optimal values of parameters and weights for this AI model.

Note that the model used in the generating method is preferably trained according to the present training method, hence referred to at step (a0) in the FIG. 2. Note that alternatively the model may be directly taken "off the shelf" with preset values of parameters and weights.

Said training method is similar to the previously described generating method, but is iteratively performed on training tomograms of the training database, i.e. a base of training pre-contrast or contrast tomograms respectively depicting a target body part prior to and during an injection of contrast agent, each tomogram being at least associated to the corresponding raw projection data from which it has been generated, the training pre-contrast or contrast tomograms are organized in the base into sequences corresponding to the same injection. Each tomogram may be further associated to reference value(s) of at least one injection parameter of said injection of contrast agent for training the prediction model.

In particular, the training method comprises, for each of a plurality of training pre-contrast tomograms from the training base stored on the storage means 12a of the first server 1a, the steps (B) and (C), respectively corresponding to steps (b) to (c) of the processing method.

In the step (B), said target body part is segmented on the training pre-contrast tomogram. Note that the training pre-contrast tomogram could be pre-segmented, i.e. said step (B) is performed long before.

In the step (C), a candidate contrast tomogram is generated by application of the tomosynthesis reconstruction model to said segmented pre-contrast tomogram and at least a part of the raw projection data associated to a training contrast tomogram of the same sequence, said part corresponding to the raw projection data acquired over a limited rotation angle span during the injection of contrast agent, and minimizing a distance with the training contrast tomogram (in other words, said training contrast tomogram of the same sequence is the expected contrast tomogram from which the candidate contrast tomogram generated by the tomosynthesis reconstruction model shall be as close as possible).

Note that either the raw projection data associated to the training contrast tomogram is "complete" (i.e. acquired over a wide rotation angle span), and these raw projection data are filtered so that the tomosynthesis reconstruction model could be applied to the raw projection data acquired over a limited rotation angle span during the injection of contrast agent; or the raw projection data associated to the training contrast tomogram is directly acquired over the limited rotation angle span.

Any training protocol adapted to the AI types of the tomosynthesis reconstruction model known to a skilled person may be used.

The prediction model could be trained as described in the application EP21315120.

Computer Program Product

In a third and fourth aspect, the invention provides a computer program product comprising code instructions which, when the program is executed by a computer, cause the computer to carry out a method (particularly on the data processor 11a, 11b of the first or second server 1a, 1b) according to the second aspect of the invention for training a tomosynthesis reconstruction model, or a method according to the first aspect of the invention for generating at least one contrast tomogram depicting a target body part during an injection of contrast agent, and storage means readable by computer equipment (memory of the first or second server 1a, 1b) provided with this computer program product.

The invention claimed is:

1. A method, comprising implementation, by a data processor of a server, of steps of:

(a) obtaining a pre-contrast tomogram depicting a target body part prior to an injection of contrast agent, and raw projection data acquired over a limited rotation angle span during the injection of contrast agent;

(b) segmenting said target body part on the pre-contrast tomogram;

(c) generating a contrast tomogram depicting the target body part during the injection of contrast agent, by application of a tomosynthesis reconstruction model to said segmented target body part and the obtained raw projection data;

wherein said contrast tomogram and said raw projection data are respectively a i-th contrast tomogram and i-th raw projection data, with i>0, the method further comprising steps of:

(d) obtaining i+1-th raw projection data acquired over said limited rotation angle span during the injection of contrast agent; and (e) combining the segmented target body part with at least one j-th contrast tomogram, 0<j≤i, into a combined segmented tomogram and generating a i+1-th contrast tomogram by application of the tomosynthesis reconstruction model to the combined segmented tomogram and said i+1-th raw projection data.

2. The method according to claim 1, wherein said pre-contrast tomogram is generated from raw projection data acquired over a rotation angle span of at least 180° prior to the injection of contrast agent, and wherein said limited rotation angle span is inferior to 60°.

3. The method according to claim 2, wherein said raw projection data is acquired by an x-ray medical imaging device connected to the server (1b).

4. The method according to claim 1, wherein said target body part is prostate gland.

5. The method according to claim 1, comprising recursively iterating steps (d) and (e).

6. The method according to claim 5, further comprising verifying whether a termination condition is true, steps (d) and (e) being iterated if said termination condition is false.

7. The method according to claim 6, wherein said termination condition is that, for each area of signal changes between at least one k-th contrast tomogram, 0<k≤i+1, and the pre-contrast tomogram, the signal change in said area between the i+1-th contrast tomogram and the i-th tomogram is below a threshold.

8. The method according to claim 1, wherein the limited rotation angle span for acquiring the i+1-th raw projection data starts where the limited rotation angle span for acquiring the i-th raw projection data ends.

9. The method according to claim 1, wherein said tomosynthesis reconstruction model comprises an artificial intelligence model trained from a base of training pre-contrast or contrast tomograms respectively depicting a body part prior to and during an injection of contrast agent, each tomogram being at least associated to raw projection data from which it has been generated.

10. A method according to claim 1, wherein step (a) comprises determining, by application of a prediction model to said pre-contrast tomogram, candidate value(s) of at least one injection parameter of said injection of contrast agent, wherein said contrast tomogram generated at step (c) depicts said body part during injection of contrast agent in accordance with the determined candidate value(s) of said injection parameter(s), and wherein the determined candidate value(s) of said injection parameter(s) are such that a sequence of said pre-contrast tomogram and said contrast tomogram generated at step (c) minimizes a radiation dose.

11. The method according to claim 10, wherein said injection parameter(s) comprises an injection duration prior to the acquisition of the raw projection data.

12. The method according to claim 10, wherein step (a) further comprises providing said determined candidate value(s) of said injection parameter(s) to a x-ray medical imaging device, and obtaining in response the raw projection data acquired by said x-ray medical imaging device over the limited rotation angle span during the injection of contrast agent in accordance with the determined candidate value(s) of said injection parameter(s).

13. A non-transitory computer-readable medium storing code instructions which, when executed by a computer, cause the computer to carry out the method according to claim 1.

* * * * *